Figure 1:
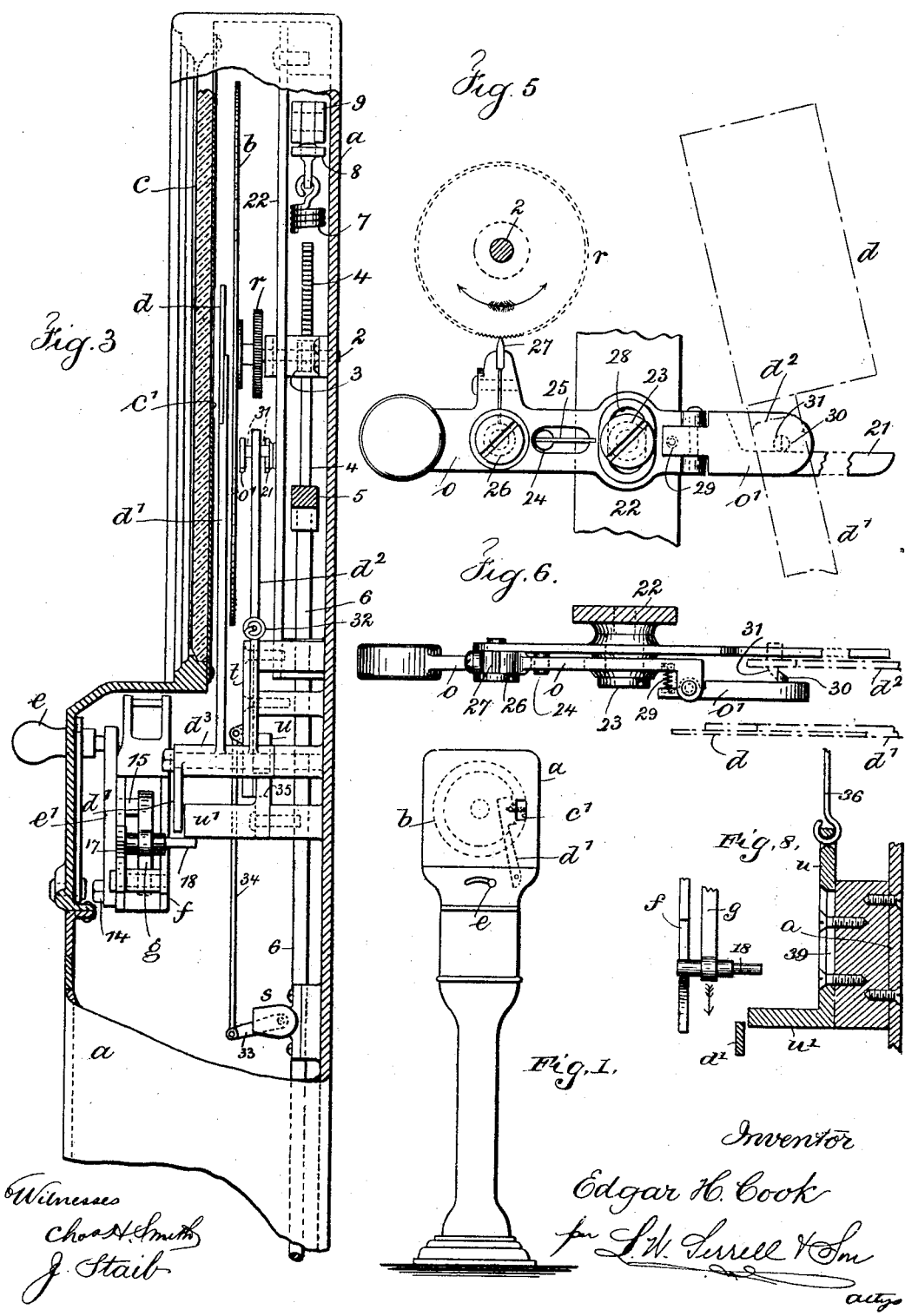

No. 664,313. Patented Dec. 18, 1900.
E. H. COOK.
WEIGHING MACHINE.
(Application filed Apr. 19, 1900.)

(No Model.) 3 Sheets—Sheet 1.

Witnesses
Chas H Smith
J. Staib

Inventor
Edgar H. Cook
per L. W. Lurrell & Son
attys

No. 664,313. Patented Dec. 18, 1900.
E. H. COOK.
WEIGHING MACHINE.
(Application filed Apr. 19, 1900.)

(No Model.) 3 Sheets—Sheet 2.

Witnesses
Chas H Smith
J. Stait

Inventor
Edgar H. Cook
per L. W. Serrell & Son
Atty

No. 664,313. Patented Dec. 18, 1900.
E. H. COOK.
WEIGHING MACHINE.
(Application filed Apr. 19, 1900.)
(No Model.) 3 Sheets—Sheet 3.
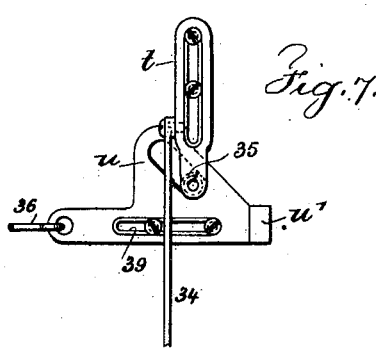
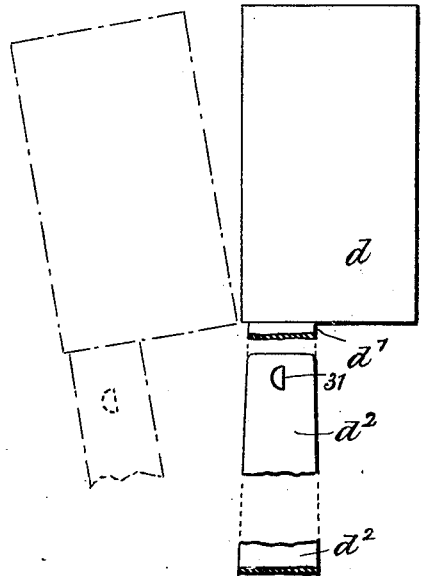
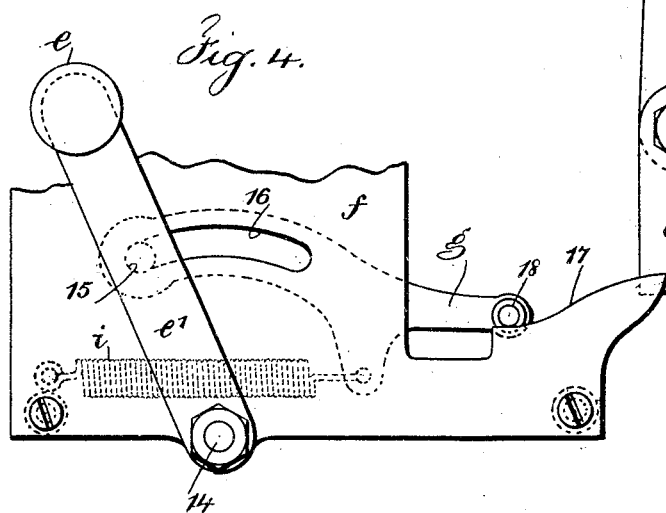
Witnesses
Chas H. Smith
J. Staib
Inventor
Edgar H. Cook.
per L. W. Serrell & Son
Atty.

UNITED STATES PATENT OFFICE.

EDGAR H. COOK, OF NEW YORK, N. Y., ASSIGNOR TO THE AUTOMATIC VENDING COMPANY, OF SAME PLACE.

WEIGHING-MACHINE.

SPECIFICATION forming part of Letters Patent No. 664,313, dated December 18, 1900.

Application filed April 19, 1900. Serial No. 13,442. (No model.)

*To all whom it may concern:*

Be it known that I, EDGAR H. COOK, a citizen of the United States, residing at the borough of Brooklyn, in the city and State of New York, have invented new and useful Improvements in Weighing-Machines, of which the following is a specification.

In this class of machines it has heretofore been usual to employ visible indicator-dials and index-fingers, the index-fingers being actuated by the weight of the person upon the platform, the mechanism being brought into operation by the insertion of a coin in the machine or by other means, the indicator-finger moving around the dial to give the weight of the person on the platform. The weighing mechanism in its simple form in these machines is usually of the same character. These machines have also been made with an indicator-dial concealed behind an ornamental face, in which face there was an opening and a cover or shutter for the opening concealing the weight upon the said dial, the said cover or shutter being actuated and moved away to discover the weight of the person upon the platform. My invention relates generally to this latter class of machines; and the object of the same is to simplify and make more positive the construction and operation of the machine, so as to prevent the same being tampered with.

In carrying out my invention the case, the platform, its lever, and the other parts of the weighing mechanism are generally of a usual character. The upper part of the case is provided with an ornamental face having an opening therein, and the indicator-dial is concealed beneath the ornamental face, and the face is provided with a pointer placed about central of the opening to indicate the weight when the cover or shutter closing the opening is moved to one side, so as to discover the dial and show the weight. I provide an operative mechanism and a means for actuating the same for moving an arm to which the said cover or shutter is connected, so that after the person to be weighed steps upon the platform and operates the weighing mechanism this operative mechanism can be actuated to move the shutter away from the opening in the ornamental face, so that the person on the platform discovers the weight through the said opening and opposite to the pointer upon the ornamental face. While I prefer to employ as such operative mechanism a coin-actuated device, such as that shown in my application for Letters Patent filed February 15, 1900, Serial No. 5,242, and in relation to which the present is a concurrent application; in the present case I have shown simply a mechanical device capable of actuating the parts without the intervention of a coin. I also provide means actuated by the arm of the shutter for holding the same away from the opening and which means is released in order that the shutter may recover the opening not only when the person steps off the platform, but also when the weight on the platform is either slightly decreased or increased. I also provide a registering mechanism for indicating the number of operations of the device, the same being a tally upon the amount paid where the weighing-machine is used in connection with a coin device.

The details of the mechanism and the operations thereof are hereinafter more particularly set forth.

Figure 2:
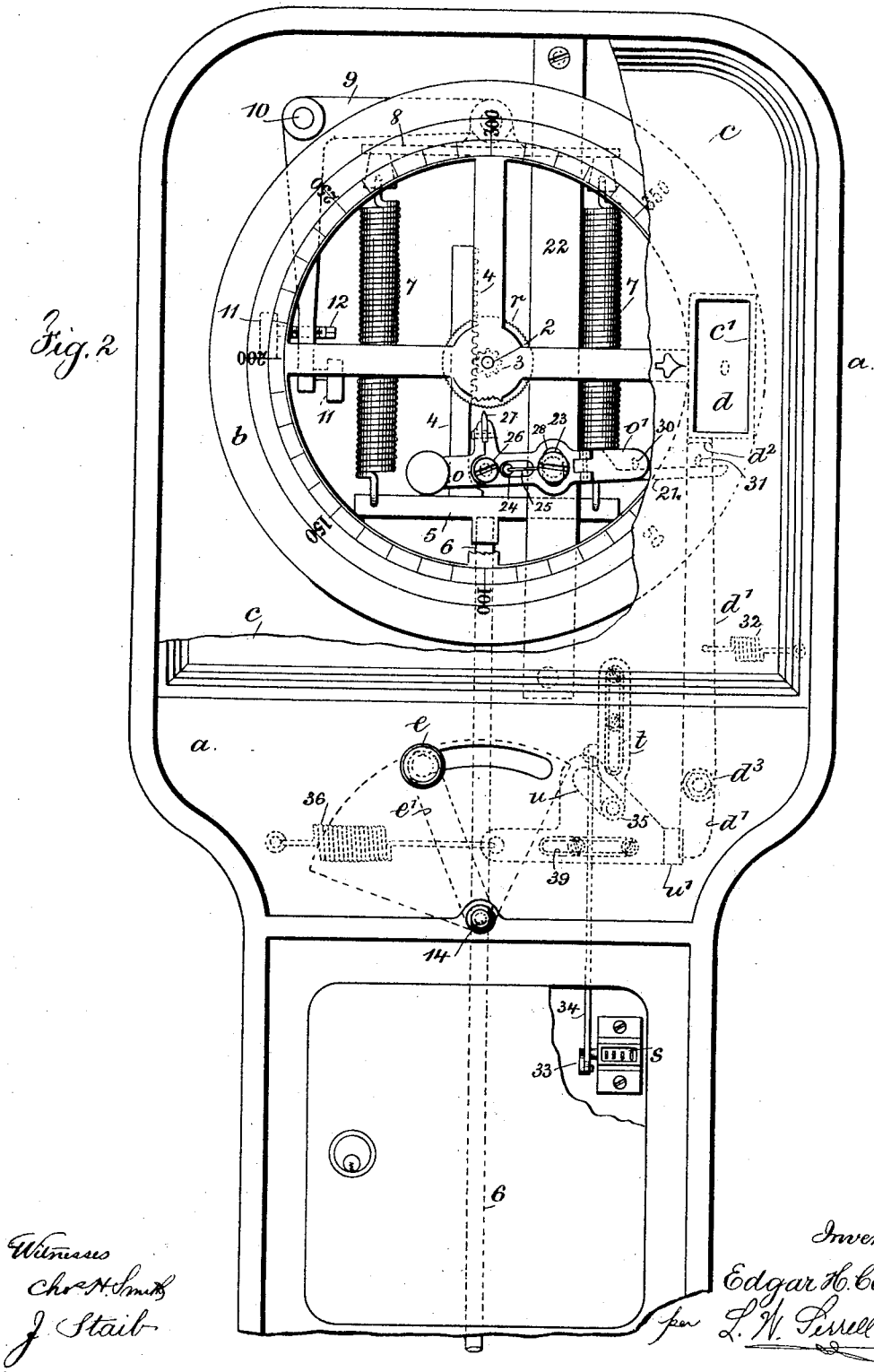

In the drawings, Figure 1 is an elevation, in small size generally, representing a weighing-machine according to my invention. Fig. 2 is an elevation of the case, the weighing mechanism, and some of the operative parts with the outer face broken. Fig. 3 is a vertical section and partial elevation of the parts shown in Fig. 2. Fig. 4 is an elevation of the shutter and the operative mechanism for operating the same. Fig. 5 is a side elevation, and Fig. 6 a plan, of the devices for locking and releasing the arm of the shutter. Fig. 7 is an elevation of the devices for actuating the registering mechanism, and Fig. 8 is a sectional plan showing the operative relation between the reciprocating plate and the parts actuated thereby.

The case $a$ of the weighing-machine is of any desired character and configuration. The same contains the indicator-dial $b$ upon an axis 2, the axis being provided with a pinion 3, and there is a rack 4, engaging the pinion 3, the lower end of which rack is connected to the cross-head 5, and a rod 6 extends from the cross-head 5 to the lever of the weighing-platform, which parts are not shown. Helical springs 7, connected at their lower ends to the cross-head 5, are connected at their upper ends to a cross-head 8, which latter cross-head is connected to a bell-crank supporting-lever 9, pivoted at 10 to the case and whose free end is provided with an adjusting-screw 12, there being stops 11 for the free end of the lever and the adjusting-screw, so that the proper tension may be applied to the springs. These parts are old in weighing devices, and I do not in any sense claim the same.

I employ a face $c$ in front of the indicator-dial $b$, which face is preferably ornamented and so made attractive, and the said face is of such a character that the indicator-dial $b$ behind the same is not visible. At one side in said face $c$ I provide a rectangular opening $c'$, preferably placed vertical, and there is a pointer on the surface of the face about midway of the said opening to produce an imaginary line which shall coincide with one of the spaced lines of the dial to indicate the weight.

I provide a shutter $d$ behind the face $c$, covering the opening $c'$ therein, which shutter is necessarily slightly larger than the opening. This shutter is mounted upon an arm $d'$, connected to a hub $d^3$, upon which hub is a second arm $d^2$. The arm $d'$ is located between the face $c$ and the dial $b$ and the arm $d^2$ behind the dial $b$. On the arm $d^2$ there is a latch-stud 31, and a spring 32 is connected at one end to the arm $d^2$ and at the other end to the case $a$ of the machine. The said hub $d^3$ is mounted upon a stud projecting from the back of the case of the machine, and from the said hub there is a downward-extending arm which is practically a continuation of the arm $d'$ and which for the purpose of explanation is given the same letter of reference.

I employ a suitable operative mechanism for imparting a swinging movement upon the hub $d^3$ of the arms $d'$ $d^2$ and a shutter $d$, and while I do not limit myself in any respect to the details or parts of the operative mechanism I have shown, as illustrative of the same, a handle $e$, projecting through a curved mortise in the case, the same being connected to a crank-arm $e'$ within the case, and I prefer to employ a plate against the inner surface of the case connected to the handle and covering the curved mortise in the case, so as to prevent mischievous persons reaching or tampering with the mechanism through the said mortise. The shaft 14, carrying the crank-arm $e'$, is pivoted in a frame $f$ of the operative device, and this frame is to be secured to the case of the weighing mechanism in any suitable manner. On the crank-arm $e'$ I have provided a stud 15, passing through a curved slot 16 in the frame $f$, and the said stud on the other side of the frame is connected to a reciprocating plate $g$, which is moved back and forth by the handle $e$ and crank-arm $e'$ and the said stud 15, and to insure the return movement I provide a spring $i$, one end of which is fastened to the frame $f$ and the other end to a prolongation of the reciprocating plate $g$. The frame $f$ is provided with a slide-way 17 and the reciprocating plate $g$ with a projection or pin 18, moving over said slide-way 17 and adapted to come against the lower end of the arm $d'$ to swing the arms $d'$ $d^2$ and move the shutter $d$.

The longitudinal movement of the reciprocating plate $g$ actuates a registering mechanism $s$, Figs. 2 and 3, to indicate or keep tally with the number of times that the weighing device has been in operation. This registering device is preferably provided with a numbered dial and a crank-arm 33, to which the lower end of a rod 34 is pivoted, the upper end of the rod 34 being pivoted to a vertically-slotted movable plate $t$, held to a foundation by guiding-screws. (See Fig. 7.) The lower end of the plate $t$ is provided with a roller 35, which roller moves in an inclined slot in the cam-plate $u$. This cam-plate is also slotted at 39 for guiding-screws connecting the same to a foundation and which are placed for the horizontal movement of the said cam-plate. The cam-plate is provided with an arm $u'$ on one end, and a spring 36, connected at one end to the case, is connected at the other end to an eye of the said cam-plate, and the pin or stud 18 on the reciprocating plate $g$ of the operative mechanism and which in its forward movement actuates the pivotal arms $d'$ $d^2$ also simultaneously comes in contact with the arm $n'$ to move the cam-plate $u$ and through the inclined slot and roller 35 to raise the movable plate $t$ and actuate the registering device, the spring 36 returning the plate $t$ and cam-plate $u$ to their normal position with the return of the operative mechanism to a normal position.

Upon the axis 2 of the weighing mechanism I place a fine-toothed wheel $r$, which turns with the indicator-dial as the same moves to indicate the weight and returns to its normal position. I provide an arm 21, pivotally connected to an upright 22 in the case of the machine, the said connection being formed by a screw-stud 23, which secures the said arm to the upright, but permits a slight swinging movement. The right-hand end of the arm 21 is reduced in width to form a projecting finger, the upper surface of which forms a way for the latch-stud 31 of the pivoted arm $d^2$. To the left-hand end of the arm 21 I connect a rocker-arm $o$, the same having a weight at the left-hand end and a pivoted latch-bar $o'$ at the right-hand end. The rocker-bar $o$ and the arm 21 are pivotally connected by a screw-stud 26, and in a mortise of the bar $o$ there is a stud 24, secured to the arm 21, and a spring 25 is provided, with one end passing through the stud 24 and the other end engaging the bar $o$. The bar $o$ is provided with a mortise 28, encircling the screw-stud 23, which, as hereinbefore stated, connects the arm 21 to the upright 22, this mortise providing for the pivotal movement of the rocker-bar $o$ independent of the arm 21.

The bar $o$ and the latch-bar $o'$ are pivotally connected, and I provide a spring 29 between the surface of the bar $o$ and the short end of the latch-bar $o'$, and on the outer end of the latch-bar $o'$ there is a latch-stud 30. The rocker-bar $o$ is preferably made with an upward projection that is divided to form jaws for receiving and holding a removable tooth 27, which tooth is adapted to come into engagement with the fine teeth of the wheel $r$ on the axis 2 of the indicator-dial $b$.

In the operation of the weighing-machine and considering that the parts are in the respective positions shown in Figs. 2 and 4 a person to be weighed steps upon the platform and operating the lever and rod pulls down the cross-head 5, springs 7, and rack 4, rotating the pinion 3, the axis 2, and indicator-dial $b$, so that the zero-point of the indicator-dial, which in a normal condition is in line with the pointer upon the face $c$, is turned to bring the weight of the person in line with the said pointer on the ornamental face. In this position the weight is not seen, but is concealed behind the shield $d$, covering the opening $c'$ in the ornamental face. The person now brings the operative mechanism into play to actuate the shutter device. This is accomplished by the person grasping the handle $e$, moving the same to the right through the curved slot in the case, and actuating the reciprocating plate $g$ against the action of the spring $i$ to bring its stud end 18 against the lower end of the arm $d'$ to move the arms $d'$ $d^2$ and swing the shutter $d$ away from the opening $c'$ in the case and discover to the person upon the platform the weight upon the dial opposite the pointer, and simultaneously with this movement the cam-plate $u$ is moved, the slotted plate $t$ raised, and the registering device $s$ operated to record a movement of the weighing-machine. With the return to a normal position of the reciprocating plate $g$ and the handle by the spring $i$ the registering device is returned to a normal position by the spring 36. With the swinging movement of the shutter $d$ and the pivoted arms $d'$ $d^2$ the rocker-bar $o$ and arm 21 are actuated by the latch-stud 31 passing along the face of the finger projection of the arm 21 and swinging the same on its stud 23, simultaneously bringing the tooth 27 into contact with the fine-toothed wheel $r$, and as the arm $d^2$ completes its movement the stud 31 rides over the stud 30 upon the latch-bar $o'$, and passing down the opposite side thereof the flat faces of the studs 30 and 31 come into engagement, as shown in Figs. 5 and 6. Thus the shutter is held away from the opening $c'$ in the face. As the latch-stud 31 passes over the latch-stud 30 the rocker-bar $o$ and the arm 21 swing in their relation to one another upon the screw-stud 26, because of the engagement of the tooth 27 with the wheel $r$. The mortise 28 provides for this movement, and the stud 24 and spring 25 keep the bar $o$ and arm 21 in relation to one another, the spring yielding with the movement and returning the bar $o$ and latch $o'$ to a position where the studs are in engagement with one another. The arm $d^2$ moves between the finger of the arm 21 and the latch-bar $o'$, and this movement tends to separate these parts, and for this purpose the spring 29 is provided, so that the latch-bar $o'$ may yield as the stud 31 passes the stud 30 to bring the same into engagement. The shutter $d$ is thus held away from the opening $c'$ in the face so long as the person being weighed remains on the platform. If, however, the person attempts to step off and slightly reduce the weight upon the platform or if another person attempted to step on in an effort to obtain the weight of two people with one movement of the operative mechanism, the slight decrease of weight or increase of weight will necessarily cause a movement of the weighing device, and this movement will effect the fine-toothed wheel in one direction or the other and cause the same to operate upon the tooth 27 to swing the rocker-bar $o$ and latch-bar $o'$ up or down, either of which movements will be sufficient at the stud 30 to cause the same to pass down or below the stud 31 on the arm $d^2$ and free the shutter, so that the spring 32 will immediately draw the shutter toward the side of the case and close the opening $c'$ in the face $c$. In this manner it is apparent that in order to again discover a further weight upon the dial it will be necessary to go through all the operations described and to again actuate the operative mechanism.

I claim as my invention—

1. In a weighing-machine, the combination with the weighing mechanism, a face covering the indicator-dial thereof and having an opening therein, and a shutter for normally covering the opening, of a hand-operative mechanism, a device connected to the said shutter and actuated by the said mechanism, and means actuated by and with the movement of the device connected to the shutter for holding the same away from the opening in the face, and which holding devices are actuated by an increase or decrease in the weight upon the platform to release the shutter and permit the same to return to a normal position, substantially as specified.

2. In a weighing-machine, the combination with the weighing mechanism, a face covering the indicator-dial thereof and having an opening therein and a shutter for normally covering the opening, of a mechanism forming a hand-operated device, means connected to the said shutter and actuated by the said mechanism, devices actuated by the movement of the shutter for holding the same away from the opening in the face, and which devices are actuated by an increase or decrease in the weight upon the platform to release the shutter and permit the same to return to a normal position, substantially as set forth.

3. In a weighing-machine, the combination with the weighing mechanism, a face covering the indicator-dial thereof and having an opening therein and a shutter for normally covering the opening, of a mechanism forming a hand-operated device, devices connected to the said shutter and actuated by the said mechanism, and means actuated by the movement of the shutter for holding the same away from the opening in the face, and which means are actuated by an increase or decrease in the weight upon the platform to release the shutter and permit the same to return to a normal position and a registering mechanism operated by the movement of the hand-operated device for indicating the number of movements imparted to the mechanism, substantially as set forth.

4. In a weighing-machine, the combination with the operative mechanism, of a registering mechanism, a cam-plate adapted to be moved by the movement of the operative mechanism, a spring for returning the cam-plate to a normal position, a vertically-movable plate actuated by the movement of the cam-plate and an arm therefrom to and for actuating the registering mechanism, substantially as set forth.

5. In a weighing-machine, the combination with the operative mechanism, of a registering mechanism, a cam-plate having horizontal and inclined slots, and a projecting arm engaged by the operative mechanism, a support on which the cam-plate is longitudinally movable, a spring for returning the cam-plate to a normal position, a slotted vertically-movable plate, a support therefor, a roller connected to the lower end of the vertical plate and within the inclined slot of the cam-plate for raising and lowering the vertical plate with the movement of the cam-plate and an arm extending from the vertical plate to and for operating the registering device, substantially as set forth.

6. In a weighing-machine, the combination with the weighing mechanism, a face covering the indicator-dial thereof and having an opening therein, a shutter for normally covering the opening, a pivoted arm to which the shutter is connected and mechanism forming an operative device for actuating the shutter, of a toothed wheel upon the shaft of the indicator-dial of the weighing-machine, means actuated and engaged by the arm of the shutter and adapted to come into engagement with the toothed wheel of the indicator-dial for locking the shutter at the time when the weight of the machine is discovered and for holding the said shutter away from the opening in the indicator-dial so long as the tension applied to the weighing mechanism remains unaltered, substantially as set forth.

7. In a weighing-machine, the combination with the weighing mechanism, a face covering the indicator-dial thereof and having an opening therein, a shutter for normally covering the opening, a pivoted arm to which the shutter is connected and mechanism forming an operative device for actuating the shutter, of a toothed wheel upon the shaft of the indicator-dial of the weighing-machine, means actuated and engaged by the arm of the shutter and adapted to come into engagement with the toothed wheel of the indicator-dial for locking the shutter at the time when the weight of the machine is discovered, and for holding the said shutter away from the opening in the indicator-dial so long as the tension applied to the weighing mechanism remains unaltered, and which means are adapted to be operated by the movement of the toothed wheel of the indicator-dial to release the engagement with the shutter-arm and allow the same to return to a normal position, substantially as set forth.

8. In a weighing-machine, the combination with the weighing mechanism, a face covering the indicator-dial thereof and having an opening therein, a shutter for normally covering the opening, a pivoted arm to which the shutter is connected and mechanism forming an operative device for actuating the shutter through its pivoted arm, of a toothed wheel upon the shaft of the indicator-dial of the weighing-machine, an arm and weighted rocker-bar pivoted to one another, and one of which parts is pivoted to a support, means connected with the said means for engaging the said toothed wheel, means for maintaining said parts in their relation to one another, means connected to the said parts for engaging the pivoted arm of the shutter when the said parts are swung by the movement of the shutter, whereby the shutter is held away from the opening in the face and is released to return to a normal position by any slight change in the weight upon the platform of the weighing-machine, substantially as set forth.

9. In a weighing-machine, the combination with the weighing mechanism, a face covering the indicator-dial thereof and having an opening therein, a shutter for normally covering the opening, a pivoted arm to which the shutter is connected and mechanism forming an operative device for actuating the shutter through its pivoted arm, of a toothed wheel upon the shaft of the indicator-dial of the weighing-machine, an arm and weighted rocker-bar pivoted to one another, and one of which parts is pivoted to a support, one of said parts having a cut-away or reduced end and the other part having an auxiliary arm pivoted thereto, means connected with said parts for engaging the said toothed wheel, means for maintaining the parts in their relation to one another, a latch-stud upon the pivoted arm of the shutter and a latch-stud upon the said auxiliary arm, whereby with the movement of the shutter by the operative mechanism the stud of the pivoted arm moves over the reduced end of one of said pivoted parts swinging the same and the rocker-bar and engaging the stud of the auxiliary arm to lock the shutter away from the opening in the face, substantially as set forth.

10. In a weighing-machine, the combination with the weighing mechanism, a face covering the indicator-dial thereof and having an opening therein, a shutter for normally covering the opening, a pivoted arm to which the shutter is connected and mechanism forming an operative device for actuating the shutter, of a toothed wheel upon the shaft of the indicator-dial of the weighing-machine, a pivoted arm and a support therefor and a weighted rocker-bar pivoted to the said arm, means connected to the said rocker-bar for engaging the said toothed wheel, means connected to the arm of the shutter engaging the pivoted arm, means connected to the arm of the shutter and to the rocker-bar for holding the parts in locking engagement whereby a movement of the toothed wheel actuates the pivoted arm and rocker-bar for releasing the shutter, substantially as set forth.

11. In a weighing-machine, the combination with the weighing mechanism, a face covering the indicator-dial thereof and having an opening therein, a shutter for normally covering the opening, a pivoted arm to which the shutter is connected and mechanism forming an operative device for actuating the shutter, of a pivoted arm and a support therefor, a weighted rocker-bar pivoted at one end of the said arm and a finger at the other end of the said arm, a tooth connected to the rocker-bar and adapted to come into engagement with the said toothed wheel, a spring for maintaining the relation of the pivoted arm and the rocker-bar, latch-studs upon the arm of the shutter and upon the adjacent end of the rocker-bar whereby one latch-stud bears on the finger of the pivoted arm to swing the same and bring the tooth into engagement with the toothed wheel and the other latch-stud engages the similar stud upon the end of the rocker-bar to lock the parts together, substantially as and for the purposes set forth.

12. In a weighing-machine, the combination with the weighing mechanism, a face covering the indicator-dial thereof and having an opening therein, a shutter for normally covering the opening, a pivoted arm to which the shutter is connected and mechanism forming an operative device for actuating the shutter, of a pivoted arm having a finger at one end, a support therefor, a weighted rocker-bar pivoted to the other end of the said arm, a stud upon the pivoted arm, and a spring connecting the same with the rocker-bar for maintaining the relation of the two parts the one to the other, a tooth connected to the rocker-bar and engaging the said toothed wheel, a latch-bar pivoted to the other end of the rocker-bar, a spring between the short end of the latch-bar and the face of the rocker-bar, there being a mortise formed in the rocker-bar surrounding the pivot of the pivoted arm, a latch-stud on the outer end of the latch-bar and latch-studs on opposite faces of the arm of the shutter whereby the movement of the shutter swings the pivoted arm and the rocker-bar and brings the tooth into engagement with the toothed wheel and simultaneously locks the shutter away from the opening that the weight may be discovered and also whereby any movement in either direction of the toothed wheel swings the rocker-bar to separate the respective latch-studs and release the shutter, substantially as set forth.

Signed by me this 17th day of April, 1900.

EDGAR H. COOK.

Witnesses:
GEO. T. PINCKNEY,
S. T. HAVILAND.